United States Patent [19]
Alfvén et al.

[11] 4,449,577
[45] May 22, 1984

[54] METHOD OF STORING ENERGY AND SYSTEM FOR CARRYING OUT THIS METHOD

[76] Inventors: Hannes Alfvén, Lillängsvägen 3, S-183 64 Täby; Nicolai Herlofson, Marknadsvägen 291 NB, S-183 34 Täby; Miroslav Babic, Kallkärrsvägen 1, S-141 41 Huddinge; Ernst-Ake Brunberg, Frejavägen 34, S-182 64 Djursholm, all of Sweden

[21] Appl. No.: 287,749

[22] PCT Filed: Dec. 4, 1980

[86] PCT No.: PCT/SE80/00314
§ 371 Date: Jul. 31, 1981
§ 102(e) Date: Jul. 31, 1981

[87] PCT Pub. No.: WO81/01726
PCT Pub. Date: Jun. 25, 1981

[30] Foreign Application Priority Data
Dec. 11, 1979 [SE] Sweden .................. 7910174

[51] Int. Cl.³ .......................................... F28D 21/00
[52] U.S. Cl. .................. 165/104.12; 60/673; 60/659
[58] Field of Search .......... 165/104.12; 60/649, 60/673, 659

[56] References Cited
U.S. PATENT DOCUMENTS
3,642,059  2/1972  Greiner ................. 165/104.12
4,303,121 12/1981  Pangborn ............. 165/104.12

Primary Examiner—Allen M. Ostrager
Attorney, Agent, or Firm—Cushman, Darby & Cushman

[57] ABSTRACT

In a method of storing energy in a two-vessel system, in which one vessel (1) containing a first substance (2) comprising two components, one of which is driven off from and is caused to become absorbed by the other component, respectively, at the supply of energy to and the withdrawal of energy from the system, respectively, energy is stored in the system by pumping said one component out of said one vessel (1).

A system for carrying out this method comprises a two-vessel system, in which one chamber (1) contains a first substance (2) which comprises two components, one of which may be driven off from the other component, which on its side has the capability of absorbing said one component. The system also comprises an energy converter (6) adapted for the sucking or pumping out of said one component and which is incorporated in a conduit (4) connected to said one chamber (1).

Thanks to the above method and system it has become possible to store mechanical or kinetic energy, e.g. from a wind power plant, in the form of chemical energy for later removal of mechanical or kinetic energy without the necessity of passing through heat energy.

8 Claims, 4 Drawing Figures

METHOD OF STORING ENERGY AND SYSTEM FOR CARRYING OUT THIS METHOD

BACKGROUND OF THE INVENTION

This invention relates to a method of storing energy in a two-vessel system in which one vessel contains a first substance comprising two components, one of which is driven off and later becomes absorbed, respectively, by the other component upon the supply of energy to and withdrawal of energy from the system. The invention also includes a system adapted to carry out this method.

Such two-vessel systems comprise two chambers or vessels which are interconnected by at least one or sometimes two conduits, so that an at least substantially closed circulation system is formed.

In a known two-vessel system, which is disclosed in the U.S. Pat. No. 4,186,794 and is primarily designed for heating purposes, one chamber of the system contains a hydrate, particularly $Na_2S.nH_2O$, and the other chamber of the system contains water. When energy is stored (charging) water is distilled away from the hydrate, and the water vapor formed is conducted to the other chamber of the system, where it condenses. When energy is withdrawn, the substance in said one chamber of the system absorbs water vapor from the other vessel or chamber.

In a paper "The Sun energy-no parenthesis" by Gunnar Wettermark and Hans Stymne in the journal VVS 5/1977 a system is described whose one vessel contains a first ammoniate and whose second vessel contains a second ammoniate. The vessels are interconnected by means of a first conduit and a second conduit. At storing ammonium, distills from said one chamber, which has then a high temperature, through said first conduit over to the second vessel which has a low temperature. The first conduit suitably passes through a heat exchanger in which the ammonium is caused to give off heat to air for the heating of rooms or the like. For the extraction of energy a valve is opened in the second conduit in which a turbine is interconnected, ammonium being conducted from the second vessel through the turbine into said one vessel which is now being maintained at the same temperature as the second chamber by a heat exchange means. In this known system the energy stored in a first ammoniate is taken out in the form of mechanical energy. During the charging operation supplied heat energy is stored partly in a second ammoniate as chemical energy, and partly in a store magazine as sensible heat energy.

In the two systems described above the stored energy is taken from the sun by means of solar collectors and heat exchanger windings coupled to the solar collectors and located in the contents of said one chamber.

SUMMARY OF THE INVENTION

The present invention is based upon the knowledge that it is possible to store mechanical energy as chemical energy in systems of the kind in question by means of an energy converter. A primary object of the invention is to make possible storing of mechanical energy, e.g. from a wind power plant. This object is attained thanks to the fact that the method and the system according to the invention are carried out in such a way as is set forth in the following detailed description and the claims.

BRIEF DESCRIPTION OF THE DRAWINGS

Further features and advantages of the method and the system according to the invention will become apparent from the following detailed description and the annexed drawings which diagrammatically and as non-limiting examples illustrate some preferred embodiments of the invention.

In FIG. 1 1 designates one chamber or vessel which contains a salt $Na_2S.nH_2O$ as said one substance 2. 3 is the other chamber or vessel of the system, which contains water and is in thermal equilibrium with the chamber 1 (and accordingly is thermally connected to and has substantially the same temperature as the chamber 1). The chambers 1 and 3 communicate with each other through a tubular conduit 4 which comprises at least one valve 5 and in which an energy converter 6 is interconnected. In the substance 2 there is provided one or more gas channels 11 to facilitate the gas transport to and from the substance, as well as a set of metal flanges 13 in contact with the wall 12 to facilitate or enhance the distribution of the heat energy between wall and salt mass. In the chamber 3 there are also provided a plurality of suitably vertical and mutually parallel metal fins or the like 14 to provide a good thermal contact between the wall 12, the liquid in the chamber and pumped-in, condensable gases. Said flanges 13 or fins 14 are suitably provided with a liquid absorbing material, e.g. fabric at least partially, to facilitate the distribution of the liquid over a larger area when the liquid is vaporized at the discharge of the system and heat energy is consequently transferred from the fins to the vaporized liquid.

Figure 1:
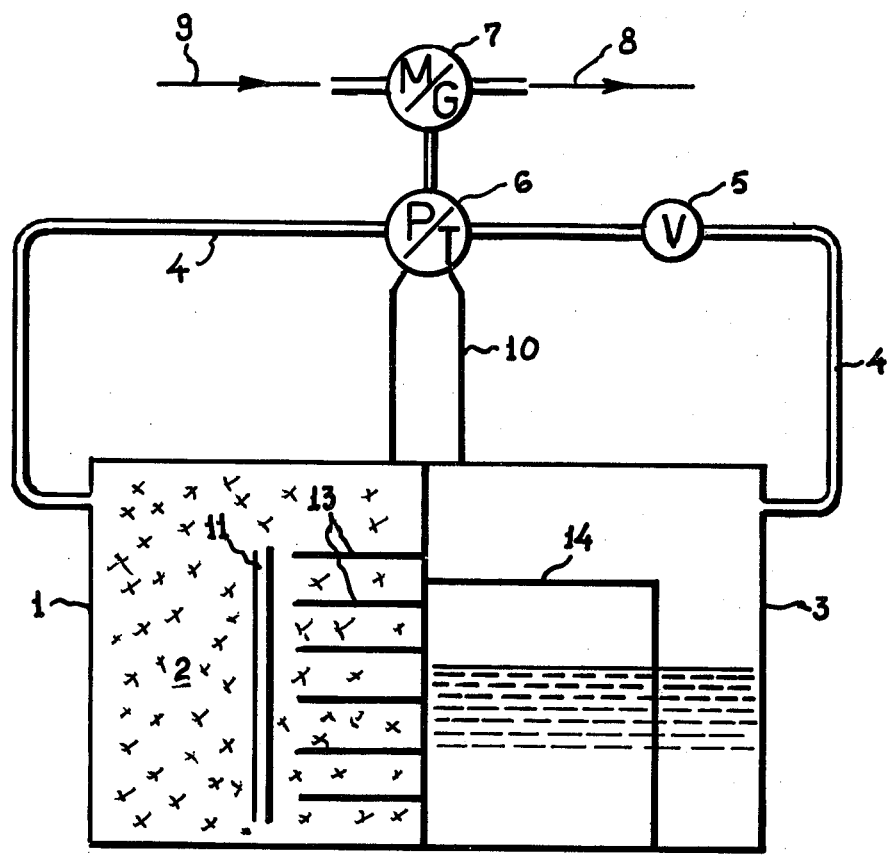
FIG. 1 is a basic view of a system according to a first embodiment of the invention.
Figure 2:
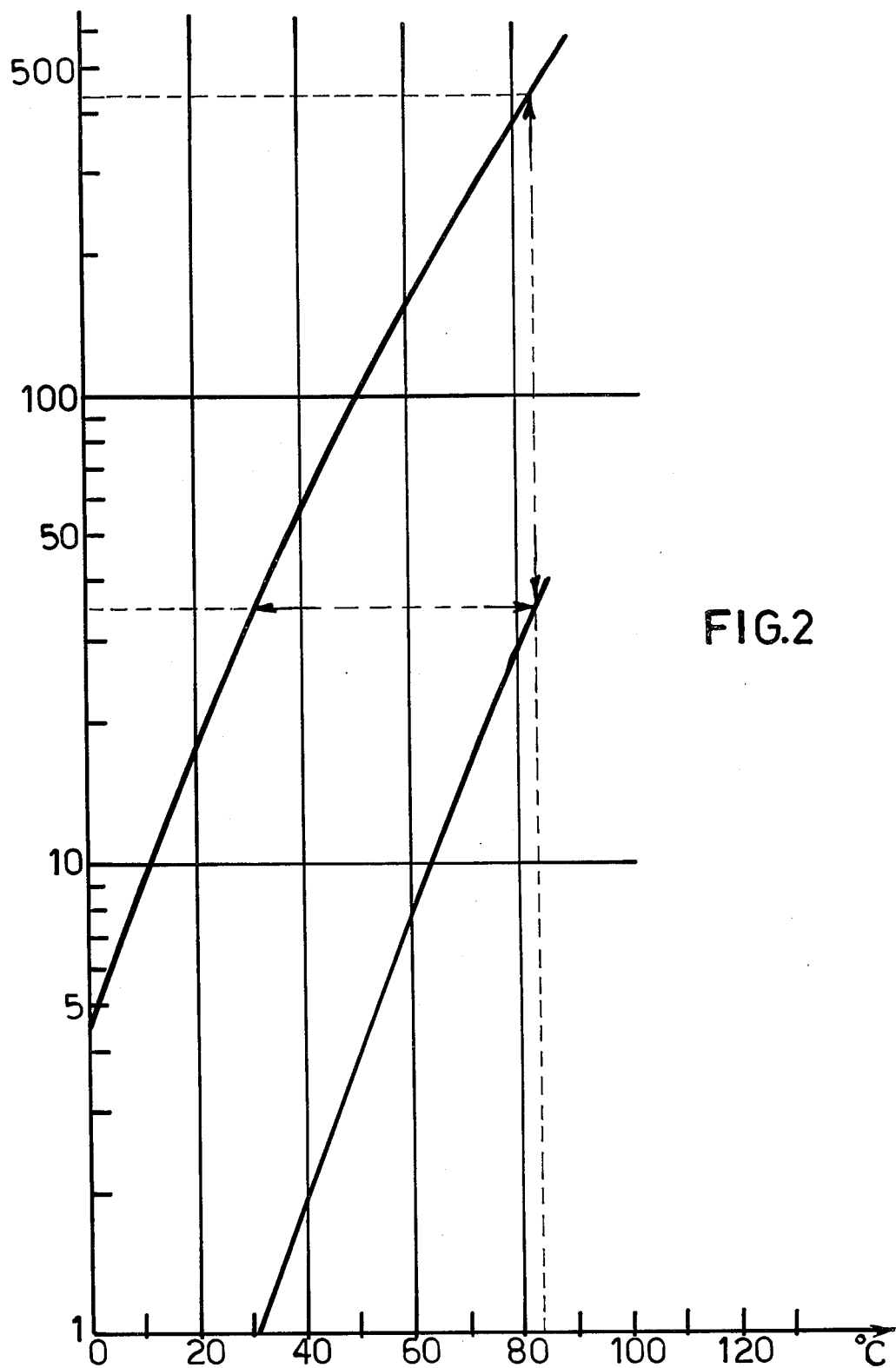
FIG. 2 is a diagram of the pressure of equilibrium above water and $Na_2S.nH_2O$ as a function of temperature.

If it is preseumed, as an example, that the temperature in the two vessels or containers 1, 3 is +85° C., a pressure difference of about 7,35 pounds per square inch (400 mm Hg) or about ½ atmosphere is present between the water vessel and salt vessel 1 and 3 respectively. The pressure difference may be utilized to operate the energy converter 6, and mechanical work or energy can thus be taken out from the system. In the example the water vapor expands from the pressure 400 mm Hg to about 300 mm Hg. Theoretical calculations indicate that for each mol water vapor that is transferred from the water vessel 3 to the salt vessel 1 about 10000 Ws is converted into mechanical energy in the energy converter 6. When the water vapor is absorbed by the salt 2, heat energy is freed, dehydration energy in the salt (about 18000 Ws/mol absorbed vapor) as well as condensation energy from the vapor. Part of this total heat energy is transferred from the salt vessel 1 to the water vessel 3 through thermal conduction, the energy being used to vaporize more water.

The mechanical energy taken out from the energy converter 6 at isothermic expansion may be written:

$$W_{mek} = R.T. \ln P_2/P_1 \text{ Ws/mol vapor,}$$

where
  R = the gas constant

T = the absolute temperature (°K.)
P$_2$ = the pressure in the water vessel 3
P$_1$ = the pressure in the salt vessel 1.

With substances which are ideal for the purpose the major portion of the chemical energy (dehydration energy in the example), i.e. the free energy, is theoretically converted into mechanical energy. Thereby the energy converter has to operate with the expansion ratio P$_2$/P$_1$. The high rate of convertion is due to the fact that the process takes place isothermally or almost isothermally, and the energy of vaporization circulates in the water vessel 3→the conduit 4 →the energy converter 6→the conduit 4→the salt vessel 1→the water vessel 3 of the system.

For the system Na$_2$S and H$_2$O the dehydration energy amounts to about 18000 Ws/mol absorbed vapor, and of this freed chemical energy only about 10000 Ws is converted to kinetic energy, as mentioned above. This means that about 56% of the dehydration energy chemically stored is "free energy". 1 kg dry Na$_2$S thus has a potentially stored kinetic energy of about 0,15 kWh. The corresponding amount based upon the total of Na$_2$S and absorbed water is 0,08 kWh/kg (Na$_2$S+water). This may be compared to a lead accumulator in which the energy density in practice is about 0,037 kWh/kg.

The energy converter 6 which is interconnected in the conduit 4 and in which the pressure difference between the chambers 1 and 3 can be utilized, may be e.g. a piston engine or, as presumed in FIG. 1, a steam turbine which is driven by the flowing vapor. According to FIG. 1 the turbine is coupled to an electric generator 7 feeding a electric power line 8.

The rate of conversion of the system approaches the theoretical value if the pump 6 is in thermal contact with the two chambers 1 and 3.

According to the invention energy is stored in the system by sucking water vapor out of the substance 2 and pumping this vapor into the chamber 3 through the conduit 4. According to the above the pressure in the chamber 3, in which the vapor condenses, is about 400 mm higher than that in the chamber 1 in the case chosen as an example. The discharge course thus takes place in the reverse manner of charging. The pumping may be carried out by means of the energy converter 6 which is now driven as a pump by the generator 7 which operates as a motor during the storage of energy. According to a preferred embodiment of the invention power for the driving of the motor 7 is taken from a wind power plant (not shown) through an electric power line 9. According to the invention it is thus possible to store kinetic energy from the wind power plant in the form of chemical energy for future extraction of mechanical or kinetic energy.

Another method consists in converting the mechanical energy yielded by the wind power plant into chemical energy by directly conecting the power plant mechanically to the energy converter (the pump), the energy accumulator being integrated with the wind power plant.

Figure 3:
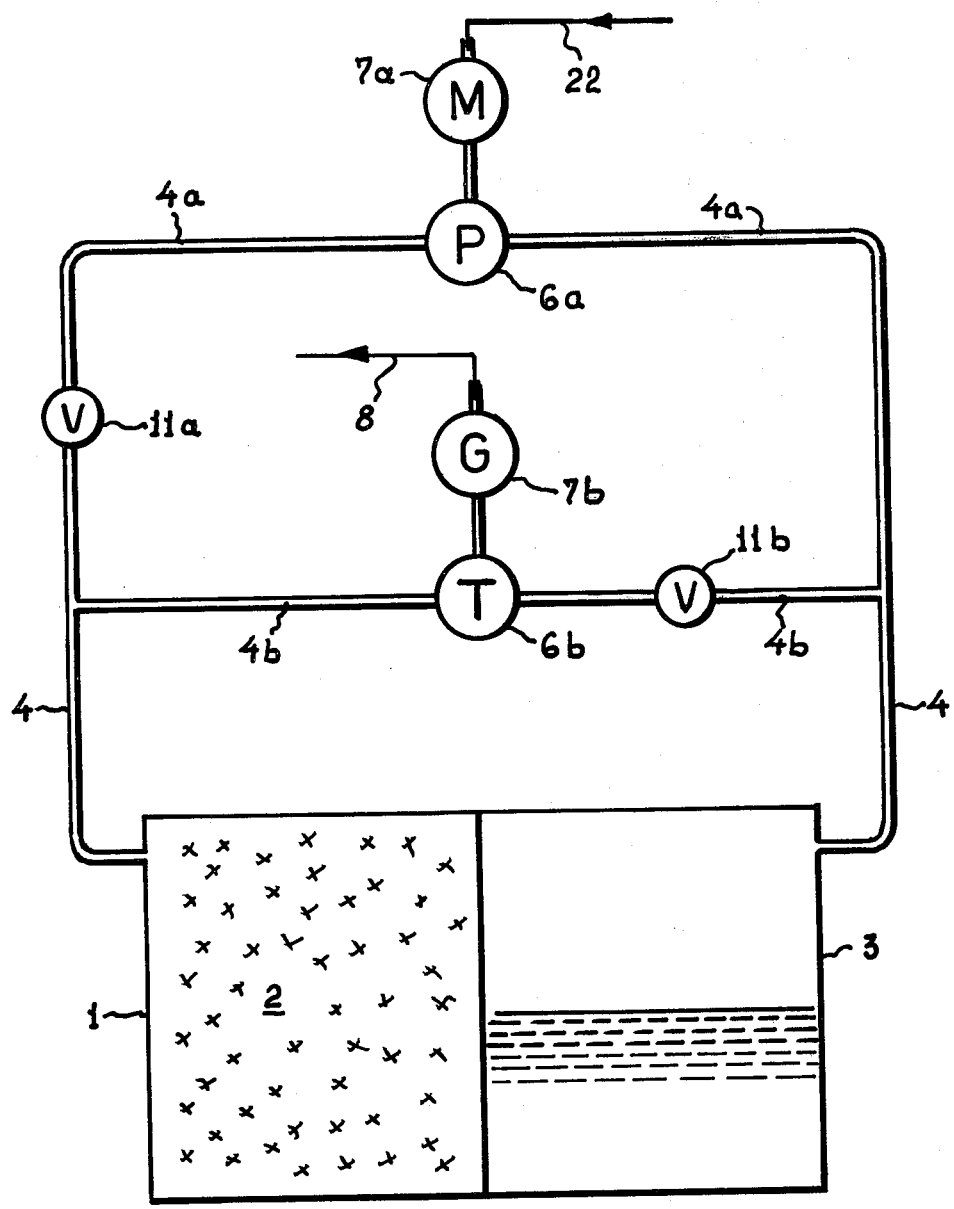
FIG. 3 illustrates a modification of the system according to FIG. 1.

It is, of course, within the scope of the invention to divide the conduit 4 into two branch conduits 4a and 4b, each having an energy converter 6a and 6b, respectively, according to FIG. 3. As is apparent therefrom, the energy converter 6a is comprised of a pump, by means of which water vapor is pumped from the lower pressure in the chamber 1 to the higher pressure in the chamber 3, while the energy converter 6b is a turbine, in which the pressure drop in the conduit 4b is utilized. In analogy with the above pump 6a is coupled to the motor 7a which via the conduit 22 is connected to the wind power plant 9, while the turbine 6b drives the generator 7b which in its turn feeds the electric power line. The conduits 4a and 4b are each provided with at least one valve 11a and 11b, respectively.

Figure 4:
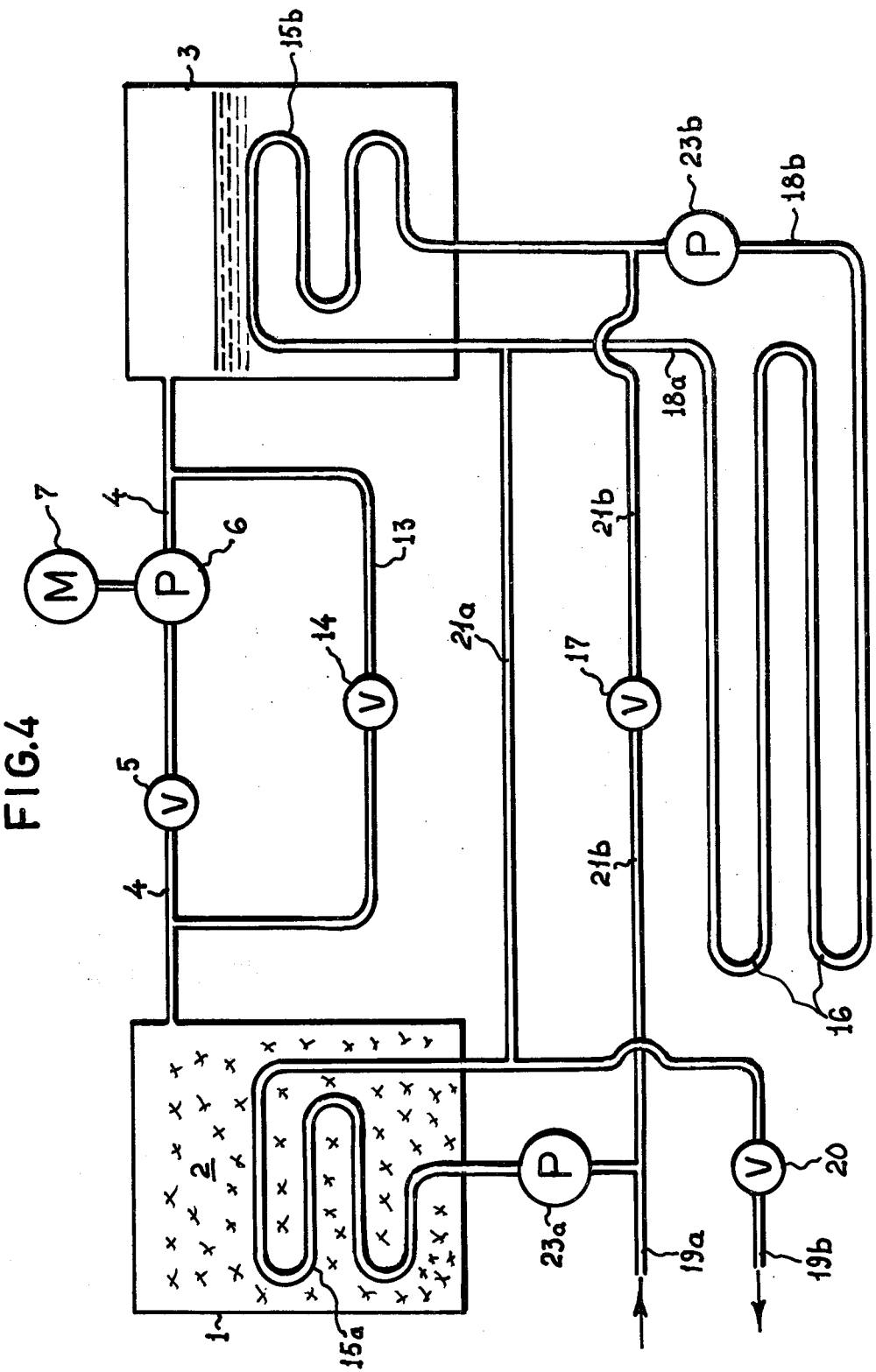
FIG. 4 is a basic diagram of a system according to a second embodiment of the invention.

The above principle to charge the energy accumulator by pumping vapor or another component contained in the substance 2 from a lower pressure to a higher pressure according to the invention may be applied also to systems in which the stored energy may be utilized for heating purposes. An example hereof is illustrated in FIG. 4. In this case the system may be considered as a chemical heat pump.

It is not necessary that the same temperature and the same pressure exist in the chambers 1 and 3 in FIG. 4. This has been indicated by illustrating the chambers as being located at a certain distance from each other. As a matter of fact it is presumed in this instance that the temperature in the chamber 1 is substantially higher than that of the chamber 3. The chambers 1 and 3 are interconnected not only by the conduit 4, in which the valve 5 and the pump 6 driven by the motor 7 are inserted, but also by a conduit 13 in which a valve 14 is suitably inserted. In the substance 2 there is inserted a heat exchange winding 15a which here takes over the function of the fins 13 shown in FIG. 1 and through which a suitable, preferably liquid heat exchange fluid is circulated by means of a pump 23a through conduits 19a, 19b, which comprise a valve 20 and further heat exchangers (not shown), in which the fluid gives off heat, e.g. to air for heating purposes and/or tap water. Dehydration energy and condensation energy for the energy output from the substance 2 is brought about by the supply of water vapor to the chamber 1 from the chamber 3 through the conduit 13. The energy of vaporization to the water in the chamber 3 is taken from a ground winding 16 which may be located on the bottom of a lake or at a frost-free level in the earth where the temperature is about +5° around the year. By means of conduits 18a, 18b in which a pump 23b is interconnected the winding 16 is connected to a heat exchanger 15b which is provided in the chamber 3 and here takes over the function of the heat transferring fins 14. When the accumulator is charged by the operation of the pump 6, the chambers 1 and 3 are given substantially the same temperature due to the fact that the heat exchangers are interconnected by conduits 21a, 21b in a closed circuit in which the pump 23a is comprised.

The embodiments described above and illustrated in the drawings are, of course, to be regarded merely as nonlimiting examples and may as to their details be modified in several ways within the scope of the following claims. Especially, new embodiments which are also encompassed by the invention may be created by combining features taken from different ones of the exemplificatory embodiments described above. In particular, the system according to the invention may be made for the storage as well as the taking out of both heat energy and kinetic energy, simultaneously as well as alternatively. In addition hereto the energy converter may be a piston machine instead of a turbine.

We claim:

1. Method for the storing of energy in a two-vessel system, whose one vessel contains a first substance which comprises two components, one of which is driven off and is brought to become absorbed, respectively, by the other component at the supply of energy to and the withdrawal of energy from the system, respectively, said method comprising the steps of storing mechanical energy in the system by pumping said one component out of said one vessel and into the other vessel, while maintaining the two vessels of the system substantially in thermal equilibrium with each other, and maintaining a substantially higher pressure in said other vessel than in said one vessel during said storing of mechanical energy.

2. Method according to claim 1, wherein said first substance is a chemical substance, and said one component is a gas having the capability of being reversibly expelled and absorbed.

3. Method according to claim 1, wherein said first substance in said one vessel is a hydrate and said one component is water vapor.

4. Method according to claim 1, wherein said first substance in said one vessel is an ammoniate and said one component is ammonium.

5. Apparatus for the storing of energy in a two-vessel system, whose one vessel contains a first substance which comprises two components, one of which is expellable from the other component which, for its own part, has the capability of absorbing said one component, said apparatus comprising a conduit which interconnects said two vessels, and an energy converter provided in said conduit for withdrawing said one component from said one vessel and pumping it into said other vessel during the storing of energy.

6. Apparatus according to claim 5, wherein said energy converter is a piston engine.

7. Apparatus according to claim 5, wherein said energy converter is a rotor machine.

8. Apparatus according to claim 7, wherein said rotor machine is a turbine.

* * * * *